(12) United States Patent
Arimoto et al.

(10) Patent No.: US 7,285,598 B2
(45) Date of Patent: Oct. 23, 2007

(54) POLYMER AND PROCESS FOR PRODUCING THE SAME

(75) Inventors: Kikuo Arimoto, Tsukuba (JP); Nobuhiro Moriguchi, Kurashiki (JP); Hiroyuki Ohgi, Tsukuba (JP); Yukiatsu Komiya, Tokyo (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/546,003

(22) PCT Filed: Feb. 23, 2004

(86) PCT No.: PCT/JP2004/002074

§ 371 (c)(1), (2), (4) Date: Aug. 18, 2005

(87) PCT Pub. No.: WO2004/076523

PCT Pub. Date: Sep. 10, 2004

(65) Prior Publication Data

US 2006/0149009 A1    Jul. 6, 2006

(30) Foreign Application Priority Data

Feb. 28, 2003    (JP) .............................. 2003-053028

(51) Int. Cl.
*C08F 8/04* (2006.01)
*C08G 61/08* (2006.01)

(52) U.S. Cl. ............................. 525/328.8; 525/326.5; 525/327.3; 525/338; 525/940; 526/171; 526/309

(58) Field of Classification Search ............ 525/326.5, 525/327.3, 328.8, 338, 940; 526/279, 273, 526/171, 309
See application file for complete search history.

(56) References Cited

U.S. PATENT DOCUMENTS

| 6,153,714 | A | 11/2000 | Bansleben et al. |
| 6,203,923 | B1 | 3/2001 | Bansleben et al. |
| 6,506,860 | B1 | 1/2003 | Bansleben et al. |
| 6,559,241 | B2 | 5/2003 | Iwasaki et al. |
| 6,613,910 | B2 | 9/2003 | Grubbs et al. |
| 6,759,537 | B2 | 7/2004 | Grubbs et al. |
| 6,818,586 | B2 | 11/2004 | Grubbs et al. |
| 6,838,489 | B2 | 1/2005 | Bell et al. |
| 2002/0058812 | A1 | 5/2002 | Grubbs et al. |
| 2003/0083445 | A1 | 5/2003 | Grubbs et al. |
| 2006/0149009 | A1 | 7/2006 | Arimoto et al. |

FOREIGN PATENT DOCUMENTS

| JP | 2002-509961 | 4/2002 |
| JP | 2003-500412 | 1/2003 |
| WO | 00/18579 | 4/2000 |

OTHER PUBLICATIONS

U.S. Appl. No. 10/546,003, filed Aug. 18, 2005, Arimoto et al.
U.S. Appl. No. 11/184,504, filed Jul. 19, 2005, Arimoto et al.
U.S. Appl. No. 11/488,122, filed Jul. 18, 2006, Arimoto et al.

*Primary Examiner*—Fred Teskin
(74) *Attorney, Agent, or Firm*—Oblon, Spivak, McClelland, Maier & Neustadt, P.C.

(57) ABSTRACT

A polymer consisting mainly of structural units represented by the general formula (1), wherein the total molar amount of terminal aldehyde groups and acetal groups is 0.6 mol % or smaller based on the total molar amount of the structural units represented by the general formula (1). —[—(—$CHR_1$—)$_n$—$CX_1R_2$—$CX_2R_3$-]— (1) (In the formula, n is an integer of 2 to 10; $X_1$ and $X_2$ each represents —H, —OH, or a functional group capable of being converted into —OH, provided that at least one of $X_1$ and $X_2$ is hydroxy or a functional group capable of being converted into hydroxy; and $R_1$, $R_2$, and $R_3$ each represents —H or $C_{1-5}$ alkyl, aryl, aralkyl, or heteroaryl and the two or more $R_1$'s may be different).

7 Claims, No Drawings

POLYMER AND PROCESS FOR PRODUCING THE SAME

TECHNICAL FIELD

The present invention relates to a polymer having a hydroxy group or a functional group that can be converted into a hydroxy group; and a process for producing the same.

BACKGROUND ART

A polymer having in the molecule thereof a functional group such as hydroxy group exhibits various properties attributable thereto such as hydrophilicity and adhesion properties. Depending on its properties, it can be used for various functional packaging materials, various functional molding materials, various sheets, films and fibers, various coating agents, and constituents of various functional alloys or blends.

Various polymers are known as such a polymer. In recent years, described in International Publication No. 99/50311 (WO99/50331) and International Publication No. 00/18579 (WO00/18579) is a polymer obtained by hydrogenating, in the presence of a hydrogenation catalyst such as palladium carbon, a polymer which is available by the ring-opening metathesis polymerization of a cycloalkene having from 7 to 12 carbon atoms and a functional group such as 5-cyclooctene-1,2-diol, and is represented by the following chemical formula:

(wherein, X and Y each represents a hydroxy group, a carboxyl group, an ester group, an amide group, a nitrile group or a carbonyl group, R represents an alkyl group having from 1 to 5 carbon atoms or the above-described X, and a and b each stands for an integer of from 0 to 6, provided that a+b falls within a range of from 2 to 7). According to it, when X and Y both represent a hydroxy group, the resulting compound is useful as a constituent of a packaging material having high oxygen barrier properties.

DISCLOSURE OF THE INVENTION

A material to be used as a constituent of a packaging material of various foods, beverages or pharmaceuticals is required to have high oxygen barrier properties. The present inventors paid attention to the polymer in the above-described documents (WO99/50331 and WO00/18579) and made a test again, resulting in failure to obtain a polymer exhibiting high oxygen barrier properties with good reproducibility.

The present invention relates to improvement of the invention as described in the above documents. Its object is to provide a polymer exhibiting excellent oxygen barrier properties with good reproducibility and analogues thereof.

The present inventors carried out an extensive investigation. As a result, they have found that certain functional groups deteriorate the physical properties of the resulting polymer such as oxygen barrier properties and completed the present invention after further investigation.

In the present invention, there is thus provided a polymer comprising mainly structural units represented by the following general formula (1):

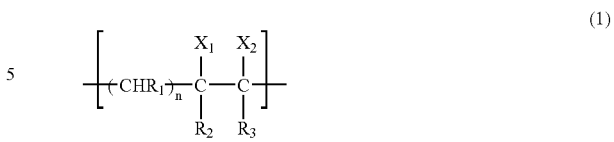

(wherein, n stands for an integer of from 2 to 10; $X_1$ and $X_2$ each represents a hydrogen atom, a hydroxy group or a functional group that can be converted into a hydroxy group, provided that at least one of $X_1$ and $X_2$ represents a hydroxy group or a functional group that can be converted into a hydroxy group; $R_1$, $R_2$ and $R_3$ each represents a hydrogen atom, an alkyl group having from 1 to 5 carbon atoms, an aryl group, an aralkyl group or a heteroaryl group, provided that plural $R_1$s may be the same or different), wherein the total molar amount of the terminal aldehyde group and acetal group contained in the polymer is 0.6 mol % or smaller relative to the total molar amount of the structural units represented by the formula (1).

In the present invention, there is also provided a process for producing the above-described novel polymer, which comprises ring-opening, in the presence of a metal alkylidene complex having a ligand with an imidazolidine structure, a cyclic olefin including at least one cyclic olefin having a hydroxy group or a functional group that can be converted into a hydroxy group, and hydrogenating the resulting unsaturated polymer.

BEST MODE FOR CARRYING OUT THE INVENTION

In the above-described formula (1) representing the structural units constituting the polymer of the present invention, $X_1$ and $X_2$ each represents a hydrogen atom, a hydroxy group or a functional group that can be converted into a hydroxy group.

Examples of the functional group that can be converted into a hydroxy group include an epoxy group and a hydroxy group protected by a protecting group.

Examples of the protecting group of a hydroxy group include alkyl groups such as methyl, ethyl and t-butyl; aralkyl groups such as benzyl; aryl groups such as phenyl; alkoxyalkyl groups such as methoxymethyl and ethoxyethyl; acyl groups such as acetyl, propionyl and benzoyl; alkoxycarbonyl groups such as methoxycarbonyl, ethoxycarbonyl, t-butoxycarbonyl and benzyloxycarbonyl; and silyl groups such as trimethylsilyl and t-butyldimethylsilyl.

Examples of the functional group that can be converted into a hydroxy group include an epoxy group; acyloxy groups such as acetyloxy and benzoyloxy; alkoxy groups such as methoxy, ethoxy, propoxy, t-butoxy, allyloxy and benzyloxy; alkoxycarbonyloxy groups or aryloxycarbonyloxy groups such as methoxycarbonyloxy, ethoxycarbonyloxy, t-butoxycarbonyloxy, phenyloxycarbony and benzyloxycarbonyloxy; alkoxyalkyleneoxy groups such as methoxymethyleneoxy, methoxyethyleneoxy and ethoxyethyleneoxy; and siloxy groups such as trimethylsiloxy and t-butyldimethylsiloxy.

As $R_1$, $R_2$ or $R_3$ in the above-described formula (1), the alkyl group having from 1 to 5 carbon atoms is, for example, a methyl, ethyl, propyl, isopropyl, n-butyl, isobutyl, n-pentyl or cyclopentyl group; the aryl group is, for example, a phenyl, naphthyl, biphenyl, phenanthryl, anthryl, triphenylenyl or pyrenyl group; the aralkyl group is, for example, a benzyl, phenethyl, naphthylmethyl or biphenylmethyl group; the heteroaryl group is, for example, a pyridyl, quinolyl, isoquinolyl, pyrrolyl, indolyl, furyl, benzofuranyl, thienyl or benzothiophenyl group.

The polymer of the present invention preferably has a hydroxy group or a functional group that can be converted into a hydroxy group in an amount of from 1 to 500 mol %, more preferably from 1 to 300 mol %, each based on the total molar amount of the structural units constituting the polymer.

The polymer of the present invention may have a structural unit other than that represented by the formula (1) as needed.

Typical examples of such a structural unit include structural units of the formula (1) wherein $X_1$ and $X_2$ both represents a hydrogen atom.

Although no particular limitation is imposed on the molecular weight of the polymer of the present invention, its number-average molecular weight (Mn) preferably falls within a range of from 1,000 to 1,000,000.

The total molar amount of the terminal aldehyde group and acetal group in the polymer of the present invention must be 0.6 mol % or smaller based on the total molar amount of the structural units represented by the formula (1).

When the total molar amount of the terminal aldehyde group and acetal group contained in the polymer exceeds 0.6 mol % based on the total molar amount of the structural units represented by the formula (1), the high order structure of the polymer is disturbed, resulting in deterioration of its physical properties such as oxygen barrier properties.

In particular, when the polymer is a crystalline polymer, the terminal aldehyde group and acetal group contained in the polymer become a factor for disturbing its crystalline structure and crystallizability. The investigation by the present inventors has revealed, for the first time, that they deteriorate the physical properties of the polymer such as barrier properties.

The total molar amount of the terminal aldehyde group and acetal group contained in the polymer of the present invention is preferably not greater than 0.55 mol % based on the total molar amount of the structural units represented by the formula (1).

In terms of properties such as oxygen barrier properties, the total molar amount of the terminal hydroxy group, terminal aldehyde group and acetal group contained in the polymer of the present invention is preferably not greater than 2 mol %, more preferably not greater than 1.8 mol % based on the total molar amount of the structural units represented by the formula (1).

In addition, the total molar amount of the terminal hydroxy group contained in the polymer of the present invention is preferably not greater than 2 mol %, more preferably not greater than 1.5 mol %, based on the total molar amount of the structural units represented by the formula (1).

The polymer of the present invention can be prepared, for example, by ring-opening, in the presence of a metal alkylidene complex having a ligand with an imidazolidine structure, a cyclic olefin containing at least one cyclic olefin having a hydroxy group or a functional group that can be converted into a hydroxy group, and hydrogenating the resulting unsaturated polymer.

In the cyclic olefin having a hydroxy group or a functional group that can be converted into a hydroxy group, examples of the functional group that can be converted into a hydroxy group include those given as the functional group that can be converted into a hydroxy group and represented by $X_1$ or $X_2$ in the formula (1).

As the cyclic olefin having a hydroxy group or a functional group that can be converted into a hydroxy group, preferred are those having a structure represented by the following chemical formula (2):

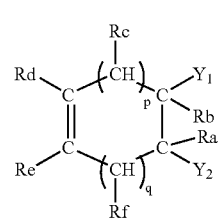

(2)

(wherein, p and q each stands for an integer of from 0 to 8, provided that p+q is an integer of from 0 to 8, $Y_1$ and $Y_2$ each represents a hydrogen atom, a hydroxy group or a functional group that can be converted into a hydroxy group, and Ra, Rb, Rc, Rd, Re and Rf each represents a hydrogen atom, an alkyl group, an aryl group, an aralkyl group or a heteroaryl group).

In the above formula (2), examples of the alkyl group represented by Ra, Rb, Rc, Rd, Re or Rf include methyl, ethyl, propyl, isopropyl, n-butyl, isobutyl, n-pentyl and cyclopentyl; those of the aryl group include phenyl, naphthyl, biphenyl, phenanthryl, anthryl, tiriphenylenyl and pyrenyl; those of the aralkyl group include benzyl, phenethyl, naphthylmethyl and biphenylmethyl; and those of the heteroaryl group include pyridyl, quinolyl, isoquinolyl, pyrrolyl, indolyl, furyl, benzofuranyl, thienyl and benzothiophenyl.

An unsaturated polymer composed of structural units represented by the below-described formula (3) is available by ring-opening polymerization of the cyclic olefin represented by the chemical formula (2).

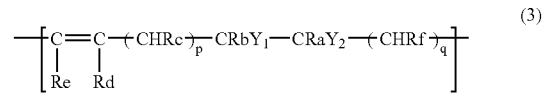

(3)

In the above-described chemical formula (2), when at least one of $Y_1$ and $Y_2$ represents a hydroxy group or a functional group that can be converted into a hydroxy group, and Ra to Rf each represents a hydrogen atom, an alkyl group having from 1 to 5 carbon atoms, an aryl group, an aralkyl group or a heteroaryl group, the compound becomes a cyclic olefin corresponding to the structural unit represented by the above-described formula (1).

Examples of the cyclic olefin corresponding to the structural unit represented by the formula (1) include:
3-cyclopenten-1-ol, 1-acetoxy-3-cyclopentene, 1-t-butoxy-3-cyclopentene, 1-methoxycarbonyloxy-3-cyclopentene, 1-trimethylsiloxy-3-cyclopentene,
3-cyclopenten-2-ol, 1-acetoxy-2-cyclopentene, 1-t-butoxy-2-cyclopentene, 1-methoxycarbonyloxy-2-cyclopentene, 1-trimethylsiloxy-2-cyclopentene,
3-cyclopentene-1,2-diol, 1,2-epoxy-3-cyclopentene, 1,2-diacetoxy-3-cyclopentene, 1,2-di-t-butoxy-3-cyclopentene, 1,2-di(methoxycarbonyloxy)-3-cyclopentene, 1,2-di(trimethylsiloxy)-3-cyclopentene, 2-cyclohepten-1-ol, 1-acetoxy-2-cycloheptene, 1-t-butoxy-2-cycloheptene, 1-methoxycarbonyloxy-2-cycloheptene, 1-trimethylsiloxy-2-cycloheptene, 3-cyclohepten-1-ol, 1-acetoxy-3-cycloheptene, 1-t-butoxy-3-cycloheptene, 1-methoxycarbonyloxy-3-cycloheptene, 1-trimethylsiloxy-3-cycloheptene, 4-cyclohepten-1-ol, 1-acetoxy-4-cycloheptene, 1-t-butoxy-4-cycloheptene, 1-methoxycarbonyloxy-4-cycloheptene, 1-trimethylsiloxy-4-cycloheptene, 3-cycloheptene-1,2-diol, 1,2-epoxy-3-cycloheptene, 1,2-diacetoxy-3-cycloheptene, 1,2-di-t-butoxy-3-cycloheptene, 1,2-di(trimethylsiloxy)-3-cycloheptene, 1,2-di(methoxycarbonyloxy)-3-cycloheptene, 4-cycloheptene-1,2-diol, 1,2-epoxy-4-cycloheptene, 1,2-diacetoxy-4-cycloheptene, 1,2-di-t-butoxy-4-cycloheptene, 1,2-di(trimethylsiloxy)-4-cycloheptene, 1,2-di(methoxycarbonyloxy)-4-cycloheptene, 2-cycloocten-1-ol, 1-acetoxy-2-cyclooctene, 1-t-butoxy-2-cyclooctene, 1-methoxycarbonyloxy-2-cyclooctene, 1-trimethylsiloxy-2-cyclooctene, 3-cycloocten-1-ol, 1-acetoxy-3-cyclooctene, 1-t-butoxy-3-cyclooctene, 1-methoxycarbonyloxy-3-cyclooctene, 1-trimethylsiloxy-3-cyclooctene, 4-cycloocten-1-ol, 1-acetoxy-4-cyclooctene, 1-t-butoxy-4-cyclooctene, 1-methoxycarbonyloxy-4-cyclooctene, 1-trimethylsiloxy-4-cyclooctene, 3-cyclooctene-1,2-diol, 1,2-epoxy-3-cyclooctene, 1,2-diacetoxy-3-cyclooctene, 1,2-di-t-butoxy-3-cyclooctene, 1,2-di(trimethylsiloxy)-3-cyclooctene, 1,2-di(methoxycarbonyloxy)-3-cyclooctene, 4-cyclooctene-1,2-diol, 1,2-epoxy-4-cyclooctene, 1,2-diacetoxy-4-cyclooctene, 1,2-di-t-butoxy-4-cyclooctene, 1,2-di(trimethylsiloxy)-4-cyclooctene, 1,2-di(methoxycarbonyloxy)-4-cyclooctene, 5-cyclooctene-1,2-diol, 1,2-epoxy-5-cyclooctene, 1,2-diacetoxy-5-cyclooctene, 1,2-di-t-butoxy-5-cyclooctene, 1,2-di(trimethylsiloxy)-5-cyclooctene, 1,2-di(methoxycarbonyloxy)-5-cyclooctene, 3-methyl-3-cycloocten-1-ol, 1-acetoxy-3-methyl-3-cyclooctene, 1-t-butoxy-3-methyl-3-cyclooctene, 1-methoxycarbonyloxy-3-methyl-3-cyclooctene, 1-trimethylsiloxy-3-methyl-3-cyclooctene, 4-methyl-4-cycloocten-1-ol, 1-acetoxy-4-methyl-4-cyclooctene, 1-t-butoxy-4-methyl-4-cyclooctene, 1-methoxycarbonyloxy-4-methyl-4-cyclooctene, 1-trimethylsiloxy-4-methyl-4-cyclooctene, 5-methyl-4-cycloocten-1-ol, 1-acetoxy-5-methyl-4-cyclooctene, 1-t-butoxy-5-methyl-4-cyclooctene, 1-methoxycarbonyloxy-5-methyl-4-cyclooctene, 1-trimethylsiloxy-5-methyl-4-cyclooctene, 4-methyl-3-cycloocten-1-ol, 1-acetoxy-4-methyl-3-cyclooctene, 1-t-butoxy-4-methyl-3-cyclooctene, 1-methoxycarbonyloxy-4-methyl-3-cyclooctene, 1-trimethylsiloxy-4-methyl-3-cyclooctene, 4-methyl-4-cyclooctene-1,2-diol, 1,2-epoxy-4-methyl-4-cyclooctene, 1,2-diacetoxy-4-methyl-4-cyclooctene, 1,2-di-t-butoxy-4-methyl-4-cyclooctene, 1,2-di(trimethylsiloxy)-4-methyl-4-cyclooctene, 1,2-di(methoxycarbonyloxy)-4-methyl-4-cyclooctene, 5-methyl-4-cyclooctene-1,2-diol, 1,2-epoxy-5-methyl-4-cyclooctene, 1,2-diacetoxy-5-methyl-4-cyclooctene, 1,2-di-t-butoxy-5-methyl-4-cyclooctene, 1,2-di(trimethylsiloxy)-5-methyl-4-cyclooctene, 1,2-di(methoxycarbonyloxy)-5-methyl-4-cyclooctene, 5-methyl-5-cyclooctene-1,2-diol, 1,2-epoxy-5-methyl-5-cyclooctene, 1,2-diacetoxy-5-methyl-5-cyclooctene, 1,2-di-t-butoxy-5-methyl-5-cyclooctene, 1,2-di(trimethylsiloxy)-5-methyl-5-cyclooctene, 1,2-di(methoxycarbonyloxy)-5-methyl-5-cyclooctene, 1-methyl-4-cycloocten-1-ol, 1-acetoxy-1-methyl-4-cyclooctene, 1-t-butoxy-1-methyl-4-cyclooctene, 1-methoxycarbonyloxy-1-methyl-4-cyclooctene, 1-trimethylsiloxy-1-methyl-4-cyclooctene, 8-methyl-4-cycloocten-1-ol, 1-acetoxy-8-methyl-4-cyclooctene, 1-t-butoxy-8-methyl-4-cyclooctene, 1-methoxycarbonyloxy-8-methyl-4-cyclooctene, 1-trimethylsiloxy-8-methyl-4-cyclooctene, 1-methyl-5-cyclooctene-1,2-diol, 1,2-epoxy-1-methyl-5-cyclooctene, 1,2-diacetoxy-1-methyl-5-cyclooctene, 1,2-di-t-butoxy-1-methyl-5-cyclooctene, 1,2-di(trimethylsiloxy)-1-methyl-5-cyclooctene, 1,2-di(methoxycarbonyloxy)-1-methyl-5-cyclooctene, 1,4-dimethyl-4-cycloocten-1-ol, 1-acetoxy-1,4-dimethyl-4-cyclooctene, 1-t-butoxy-1,4-dimethyl-4-cyclooctene, 1-methoxycarbonyloxy-1,4-dimethyl-4-cyclooctene, 1-trimethylsiloxy-1,4-dimethyl-4-cyclooctene, 5,8-dimethyl-4-cycloocten-1-ol, 1-acetoxy-5,8-dimethyl-4-cyclooctene, 1-t-butoxy-5,8-dimethyl-4-cyclooctene, 1-methoxycarbonyloxy-5,8-dimethyl-4-cyclooctene, 1-trimethylsiloxy-5,8-dimethyl-4-cyclooctene, 1,6-dimethyl-5-cyclooctene-1,2-diol, 1,2-epoxy-1,6-dimethyl-5-cyclooctene, 1,2-diacetoxy-1,6-dimethyl-5-cyclooctene, 1,2-di-t-butoxy-1,6-dimethyl-5-cyclooctene, 1,2-di(trimethylsiloxy)-1,6-dimethyl-5-cyclooctene, 1,2-di(methoxycarbonyloxy)-1,6-dimethyl-5-cyclooctene, 1,5-dimethyl-4-cycloocten-1-ol, 1-acetoxy-1,5-dimethyl-4-cyclooctene, 1-t-butoxy-1,5-dimethyl-4-cyclooctene, 1-methoxycarbonyloxy-1,5-dimethyl-4-cyclooctene, 1-trimethylsiloxy-1,5-dimethyl-4-cyclooctene, 4,8-dimethyl-4-cycloocten-1-ol, 1-acetoxy-4,8-dimethyl-4-cyclooctene, 1-t-butoxy-4,8-dimethyl-4-cyclooctene, 1-methoxycarbonyloxy-4,8-dimethyl-4-cyclooctene, 1-trimethylsiloxy-4,8-dimethyl-4-cyclooctene, 1,5-dimethyl-5-cyclooctene-1,2-diol, 1,2-epoxy-1,5-dimethyl-5-cyclooctene, 1,2-diacetoxy-1,5-dimethyl-5-cyclooctene, 1,2-di-t-butoxy-1,5-dimethyl-5-cyclooctene, 1,2-di(trimethylsiloxy)-1,5-dimethyl-5-cyclooctene, 1,2-di(methoxycarbonyloxy)-1,5-dimethyl-5-cyclooctene, 3,7-dimethyl-3-cycloocten-1-ol, 1-acetoxy-3,7-dimethyl-3-cyclooctene, 1-t-butoxy-3,7-dimethyl-3-cyclooctene, 1-methoxycarbonyloxy-3,7-dimethyl-3-cyclooctene, 1-trimethylsiloxy-3,7-dimethyl-3-cyclooctene, 4,8-dimethyl-4-cyclooctene-1,2-diol, 1,2-epoxy-4,8-dimethyl-4-cyclooctene, 1,2-diacetoxy-4,8-dimethyl-4-cyclooctene, 1,2-di-t-butoxy-4,8-dimethyl-4-cyclooctene, 1,2-di(trimethylsiloxy)-4,8-dimethyl-4-cyclooctene, and 1,2-di(methoxycarbonyloxy)-4,8-dimethyl-4-cyclooctene.

Examples of the cyclic olefin which gives a structural unit different from that represented by the formula (1) include cyclobutene, cyclopentene, 3-methyl-1-cyclopentene, 4-methyl-1-cyclopentene, cycloheptene, cyclooctene and norbornene.

The cyclic olefin represented by the chemical formula (2) comprises a compound which imparts the structural unit represented by the formula (1). It may be either a single compound or a mixture of at least two compounds.

The cyclic olefin represented by the chemical formula (2) may be copolymerized with another compound if desired. Examples of the another compound include cyclic compounds such as cyclopentadiene, dicyclopentadiene, 1,3-cyclooctadiene, 1,4-cyclooctadiene, 1,5-cyclooctadiene, 1,3,5-cyclooctatriene, 1,3,6-cyclooctatriene, 1,3,5,7-cyclooctatetraene, 1-methyl-1,5-cyclooctadiene, 1,5-dimethyl-1,5-cyclooctadiene, 1,6-dimethyl-1,5-cyclooctadiene and norbornadiene.

In the ring-opening polymerization, the ratio of the cyclic olefin imparting the structural unit represented by the formula (1) is usually in an amount of from 10 to 100 wt. %, preferably from 30 to 100 wt. % based on the cyclic olefin used as a raw material.

As the cyclic olefin imparting the structural unit represented by the formula (1), the above-described compounds may be used either singly or in combination as a mixture of two or more of them.

As a result of energetic investigation of the conditions of the ring-opening polymerization in order to obtain the polymer of the present invention, the present inventors have found that ring-opening polymerization in the presence of a metal alkylidene complex having a ligand with an imidazblidine structure is effective.

As the metal alkylidene complex having a ligand with an imidazolidine structure, especially effective compounds are those having a structure represented by the following chemical formula (4):

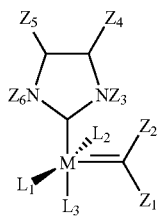

(4)

(in the above formula,

M represents a ruthenium atom or osmium atom, $L_1$ and $L_2$ each represents an anionic ligand, $L_3$ represents a neutral electron donating ligand, $Z_1$ and $Z_2$ each represents a hydrogen atom, an alkyl group having from 1 to 20 carbon atoms, an alkenyl group having from 2 to 20 carbon atoms, an alkynyl group having from 2 to 20 carbon atoms, an aryl group, an alkoxy group having from 1 to 20 carbon atom, an acyl group having from 2 to 20 carbon atoms, an alkenyloxy group having from 2 to 20 carbon atoms, an alkynyloxy or aryloxy group having from 2 to 20 carbon atoms, an alkoxycarbonyl group having from 2 to 20 carbon atoms, an alkylthio or arylthio group having from 1 to 20 carbon atoms, an alkylsulfonyl group having from 1 to 20 carbon atoms, or an alkylsulfinyl group having from 1 to 20 carbon atoms; $Z_3$, $Z_4$, $Z_5$ and $Z_6$ each represents a hydrogen atom, an alkyl group having from 1 to 20 carbon atoms, an alkenyl group having from 2 to 20 carbon atoms, an alkynyl group having from 2 to 20 carbon atoms, an aryl group, a carboxyl group, an alkoxy group having from 1 to 20 carbon atoms, an acyl group having from 2 to 20 carbon atoms, an alkenyloxy group having from 2 to 20 carbon atoms, an alkynyloxy or aryloxy group having from 2 to 20 carbon atoms, an alkoxycarbonyl group having from 2 to 20 carbon atoms, an alkylthio or arylthio group having from 1 to 20 carbon atoms, an alkylsulfonyl group having from 1 to 20 carbon atoms, or an alkylsulfinyl group having from 1 to 20 carbon atoms provided that $Z_1$ to $Z_6$ may be substituted further by an alkyl group having from 1 to 10 carbon atoms, an alkoxy group having from 1 to 10 carbon atoms, an aryl group, an acyl group having from 2 to 10 carbon atoms, a hydroxy group, an alkylthio or arylthio group having from 1 to 10 carbon atoms, a carbonyl group, an aldehyde group, an acyloxy group, an amino group, an amide group, a nitro group, a carboxyl group, a disulfide group, an alkoxycarbonyl group, an isocyanate group, a carbodiimide group, an alkoxycarbonyloxy group, a carbamate group or a halogen atom).

In the above-described chemical formula (4), it is preferred that $Z_1$ represents a hydrogen atom, and $Z_2$ represents an alkyl group having from 1 to 20 carbon atoms, an alkenyl group having from 2 to 20 carbon atoms or an aryl group.

$Z_2$ preferably represents a vinyl group which may be substituted by an alkyl group having from 1 to 5 carbon atoms, an alkoxy group having from 1 to 5 carbon atoms, a phenyl group or another functional group, or a phenyl group which may be substituted by an alkyl group having from 1 to 5 carbon atoms, an alkoxy group having from 1 to 5 carbon atoms, a phenyl group or another functional group. Of these, a vinyl group which may be substituted by a chlorine atom, a bromine atom, an iodine atom, a fluorine atom, a nitro group, a dimethylamino group, a methyl group, a methoxy group or a phenyl group, or a phenyl group which may be substituted by a chlorine atom, a bromine atom, an iodine atom, a fluorine atom, a nitro group, a dimethylamino group, a methyl group, a methoxy group or a phenyl group is more preferred, with a phenyl group or a 2-methyl-1-propenyl group being especially preferred.

In the formula (4), $L_3$ preferably represents a phosphine, sulfonated phosphine, phosphite, phosphinate, phosphonate, arsine, stibine, ether, amine, amide, imine, sulfoxide, nitrogen monoxide, carbon monoxide, pyridine or thioether, with a phosphine represented by the following formula:

$PR_7R_8R_9$ (wherein, $R_7$, $R_8$, and $R_9$ each represents an aryl group or an alkyl group having from 1 to 10 carbon atoms) being more preferred.

As $L_3$, tricyclohexylphosphine, tricyclopentylphosphine, triisopropylphosphine or triphenylphosphine are still more preferred.

In the formula (4), $L_1$ and $L_2$ each preferably represents a hydrogen atom, a halogen atom, an alkyl group having from 1 to 20 carbon atoms, an aryl group, an alkoxy group having from 1 to 20 carbon atoms, an aryloxy group, an alkyldiketonate group having from 3 to 20 carbon atoms, an aryldiketonate group, an alkoxycarbonyloxy group having from 2 to 20 carbon atoms, an acyloxy group having from 2 to 10 carbon atoms, an arylsulfonyloxy group, an alkylsulfonyloxy group having from 1 to 20 carbon atoms, an alkylthio group having from 1 to 20 carbon atoms, an arylthio group, an alkylsulfonyl group having from 1 to 20 carbon atoms or an alkylsulfinyl group having from 1 to 20 carbon atoms. More preferably, $L_1$ and $L_2$ each represents a halogen atom, a benzoyloxy group, an alkyl group having from 1 to 5 carbon atoms, a phenoxy group, an alkoxy group having from 1 to 5 carbon atoms, an alkoxycarbonyloxy group having from 2 to 5 carbon atoms, an acyloxy group having from 2 to 5 carbon atoms, an alkylthio group having from 1 to 5 carbon atoms, an arylthio group, an aryl group, an alkylsulfonyloxy group having from 1 to 5 carbon atoms or an arylsulfonyloxy group.

$L_1$ and $L_2$ still more preferably represents a halogen atom, a trifluoroacetyloxy group, an acetyloxy group, a monofluoroacetyloxy group, a t-butoxy group, a 2,2-ditrifluoromethylethoxy group, a 2-trifluoromethyl-2-propoxy group, a phenoxy group, a methoxy group, an ethoxy group, a p-toluenesulfonyloxy group, a methanesulfonyloxy group or a trifluoromethanesulfonyloxy group.

In the formula (4), it is preferred that $Z_4$ and $Z_5$ each represents a hydrogen atom or a phenyl group, or may be coupled together to form a cycloalkyl or aryl group. The cycloalkyl or aryl group may be substituted by an alkyl group having from 1 to 10 carbon atoms, an alkoxy group having from 1 to 10 carbon atoms, a hydroxy group, an alkylthio group, an arylthio group, an acyl group, an aldehyde group, an aryloxy group, a substituted or unsubstituted amino group, an amide group, a nitro group, a carboxyl group, an acyloxy group, a disulfide group, an alkoxycarbonyloxy group, an isocyanate group, a carbodiimide group, an alkoxycarbonyl group, a carbamate ester group or a halogen atom. It is more preferred that $Z_4$ and $Z_5$ each represents a hydrogen atom or a phenyl group or may be coupled together to form a cycloalkyl group.

$Z_3$ and $Z_6$ each preferably represents an alkyl group having from 1 to 10 carbon atoms or an aryl group. These groups may be substituted by an alkoxy group having from 1 to 5 carbon atoms, a hydroxy group, an alkylthio group, an arylthio group, an acyl group, an aldehyde group, an aryloxy group, a substituted or unsubstituted amino group, an amide group, a nitro group, a carboxyl group, an acyloxy group, a disulfide group, an alkoxycarbonyloxy group, an isocyanate group, a carbodiimide group, an alkoxycarbonyl group, a carbamate ester group or a halogen atom.

It is more preferred that $Z_3$ and $Z_6$ each represents a phenyl group which may be substituted by an alkoxy group having from 1 to 5 carbon atoms, a hydroxy group, an alkylthio group, an arylthio group, an acyl group, an aldehyde group, an aryloxy group, a substituted or unsubstituted amino group, an amide group, a nitro group, a carboxyl group, an acyloxy group, a disulfide group, an alkoxycarbonyloxy group, an isocyanate group, a carbodiimide group, an alkoxycarbonyl group, a carbamate ester group or a halogen atom.

As the metal alkylidene complex having a ligand with an imidazolidine structure, Compounds 1 to 6 represented by the below-described formulas are preferred.

Compound 1

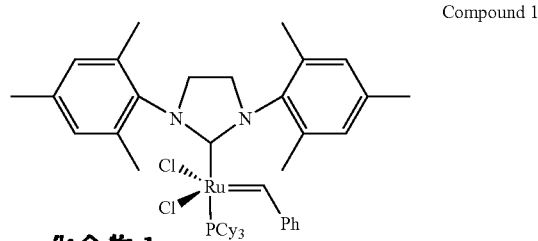

化合物 1

Compound 2

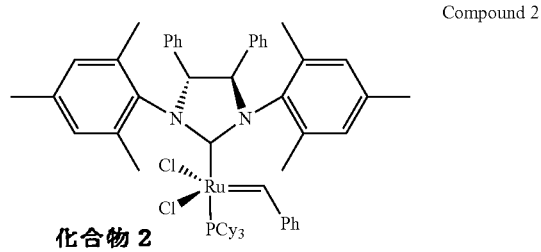

化合物 2

Compound 3

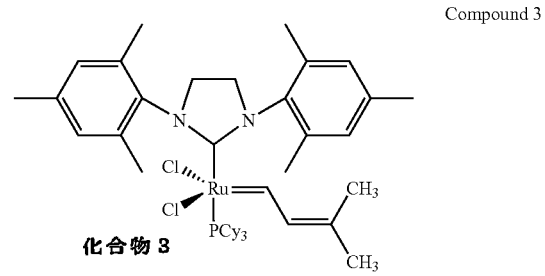

化合物 3

Compound 4

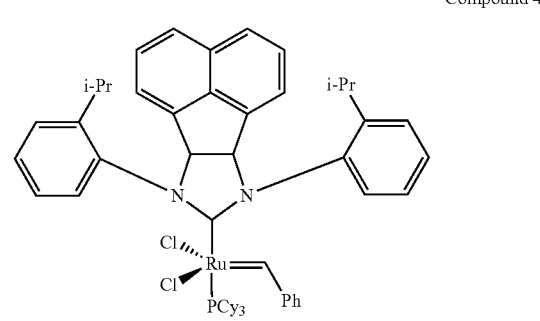

化合物 4

Compound 5

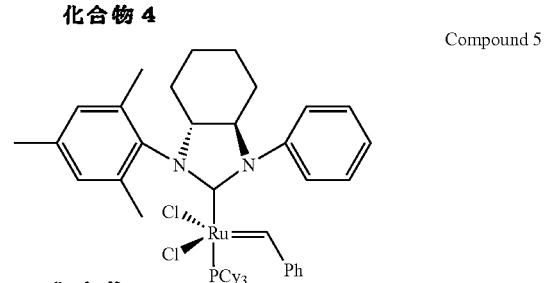

化合物 5

Compound 6

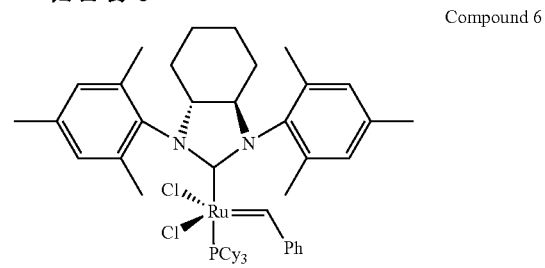

化合物 6

In the above-described formulas, i-Pr represents an isopropyl group, Ph represents a phenyl group and $PCy_3$ represents a tricyclohexylphosphino group.

Such a metal alkylidene complex is described in International Publication No. 00/71554 (WO00/71554) and is therefore known.

The using amount of the metal alkylidene complex having a ligand with an imidazolidine structure is usually in an amount ranging from 0.000001 to 0.25 mol % relative to the cyclic olefin compound.

The using amount of the metal alkylidene complex exceeding the above-described range may cause a side-reaction, during the ring-opening polymerization of the cyclic olefin compound, between the metal alkylidene complex or decomposition product thereof and the functional group of the cyclic olefin compound or may cause a side-reaction, at the time of hydrogenation which will be described later, between a metal residue derived from the metal alkylidene complex and the functional group in the polymer. As a result, total molar amount of the terminal aldehyde group and acetal group in the polymer as a final product may exceed 0.6 mol % relative to the total molar amount of the structural units represented by the formula (1). The using amounts outside the above-described range are therefore not preferred.

The using amount of the metal alkylidene complex having a ligand with an imidazolidine structure is preferably in an amount of from 0.00001 to 0.01 mol % relative to the cyclic olefin compound.

The ring opening polymerization of the cyclic olefin compound may be carried out in a solventless manner, but usually in the presence of a suitable organic solvent. Examples of the organic solvent include aromatic hydrocarbons such as benzene, toluene and xylene; aliphatic hydrocarbons such as propane, n-butane, isobutane, n-pentane, isopentane, n-hexane, n-heptane, n-octane, isooctane, decane and hexadecane; halogenated hydrocarbon solvents such as ethylene chloride, methylene chloride and carbon tetrachloride; ethers such as tetrahydrofuran (THF), dioxane, diethyl ether, dibutyl ether, ethylene glycol dimethyl ether; and alcohols such as methanol, ethanol, 1-propanol, 2-propanol, 1-butanol, 2-butanol, isobutanol, and tert-butanol. Of these organic solvents, aromatic hydrocarbons such as toluene and xylene, ethers such as THF, and alcohols such as methanol, ethanol, propanol and butanol are preferred from the standpoints of reduction in the environmental burden and their availability on an industrial scale. These organic solvents may be used either singly or in combination as a mixture of two or more.

The using amount of the organic solvent is usually in an amount not greater than 1000 times the weight, preferably not greater than 100 times the weight, each of the cyclic olefin compound.

The ring opening polymerization is performed preferably within a temperature range of from 0 to 150° C., more preferably from 20 to 130° C., still more preferably from 40 to 80° C. Ring-opening polymerization at a temperature lower than 0° C. considerably retards the progress of the polymerization and impairs the economy. Temperature exceeding 150° C., on the other hand, shortens the catalyst life. The temperatures outside the above-described range are therefore not preferred.

Time required for ring-opening polymerization preferably falls within a range of from 10 minutes to 100 hours, more preferably from 10 minutes to 48 hours, still more preferably from 10 minutes to 24 hours.

The ring-opening polymerization can be performed under normal pressure or under elevated pressure. The ring opening polymerization is preferably performed in an inert gas atmosphere such as nitrogen or argon.

The ring-opening polymerization may be performed in either one of batch process or continuous process.

In the ring-opening polymerization of the cyclic olefin compound, a suitable co-catalyst may be used in combination as needed in order to control the reaction rate or to stabilize the catalyst.

As the co-catalyst, neutral electron donors or neutral Lewis bases including phosphines, sulfonated phosphines, phosphites, phosphinates, phosphonates, arsine, stibine, ethers, amines, amides, imines, sulfoxides, carboxylic acids, carbon monoxide, nitrogen monoxide, pyridines, thioethers, nitriles, thiophenes, and furans are preferably employed.

It is possible to use, in combination, a proper chain transfer agent in order to adjust the molecular weight of the resulting unsaturated polymer during the ring-opening polymerization of the cyclic olefin compound.

As the chain transfer agent, noncyclic olefins are preferably employed. Specific examples include alkenes such as 2-butene, 2-pentene, 2-hexene, and 3-hexene; unsaturated alcohols such as 2-buten-1-ol, 3-buten-1-ol, 2-butene-1,4-diol, 2-hexen-1-ol, 3-hexen-1-ol and 3-hexen-1,6-diol; and unsaturated esters such as 1-acetoxy-2-butene, 1-acetoxy-3-butene, 1,4-diacetoxy-2-butene, 1-acetoxy-2-hexene, 1-acetoxy-3-hexene and 1,6-diacetoxy-3-hexene.

The using amount of the chain transfer agent may be in an amount of from 0.0005 to 5 mol %, preferably from 0.001 to 0.2 mol % per mole of the cyclic olefin compound. The chain transfer agent may be added in one portion when the ring-opening polymerization of the cyclic olefin compound is started or may be added in portions during the reaction.

The unsaturated polymer thus prepared by the ring opening polymerization can be isolated after the completion of the polymerization reaction by an operation usually employed for the isolation of a polymer from its solution. For example, a known method such as re-precipitation, solvent removal under heating, solvent removal under reduced pressure or solvent removal by azeotropy with water vapor (steam stripping) is adopted.

The unsaturated polymer thus formed by the ring opening polymerization may be provided for the hydrogenation reaction, which will be described later, in the form of a solution in an organic solvent without isolating it from the reaction mixture, if desired. A solvent to be used for the hydrogenation reaction may of course be added after removal of a portion of the organic solvent used for the polymerization reaction.

Then, the unsaturated polymer thus obtained can be hydrogenated into the polymer of the present invention.

No particular limitation is imposed on the hydrogenation method of the unsaturated polymer insofar as the total molar amount of the terminal aldehyde group and acetal group of the polymer as a final product does not exceed 0.6 mol % based on the total molar amount of the structural units represented by the formula (1). It can be performed in a known manner. It is, however, preferred to use a hydrogenation catalyst which does not cause a side reaction with the hydroxy group or the functional group that can be converted into a hydroxy group of the unsaturated polymer.

Any known hydrogenation catalyst can be used for this reaction. Examples include nickel catalysts such as Raney nickel, cobalt catalyst such as Raney cobalt, ruthenium catalysts such as ruthenium carbon, rhodium catalysts, palladium catalysts and platinum catalysts, and mixtures or alloy catalysts thereof.

Of these, rhodium catalysts, palladium catalysts and platinum catalyst, and mixtures or alloy catalysts thereof are preferred as a hydrogenation catalyst capable of suppressing a side reaction with the functional group of the unsaturated polymer and having sufficient hydrogenation activity. These catalysts can be used singly, as a solid or soluble uniform complex, or as a catalyst supported on a carrier such as carbon, silica or diatomaceous earth.

Specific examples of the rhodium catalyst include chlorotris(triphenylphosphine)rhodium, carbonyltris(triphenylphosphine)rhodium hydride, and bis(1,5-cyclooctadiene)rhodium trifluoromethanesulfonate.

Specific examples of the palladium catalyst or platinum catalyst include palladium catalysts supported on activated carbon and platinum catalysts supported on activated carbon, with palladium catalysts supported on basic activated carbon and platinum catalysts supported on basic activated carbon as described in U.S. Pat. No. 6,559,241 being more preferred.

The using amount of the hydrogenation catalyst is preferably in an amount of from 0.0001 to 20 parts by weight based on 100 parts by weight of the unsaturated polymer, more preferably from 0.001 to 10 parts by weight from the standpoints of economy and reaction rate, and especially preferably from 0.01 to 5 parts by weight.

The hydrogenation reaction is preferably performed in the presence of a solvent. Examples of the solvent usable here include aliphatic hydrocarbons such as pentane, hexane, octane, decane, cyclohexane, methylcyclohexane and cyclooctane; aromatic hydrocarbons such as benzene, toluene, xylene and mesitylene; alcohols such as methanol, ethanol, isopropanol and octanol; and ethers such as diethyl ether, dipropyl ether, diethylene glycol dimethyl ether, tetrahydrofuran and dioxane. These solvents may be used either singly or in combination as a mixture of two or more of them.

Although no particular limitation is imposed on the amount of the solvent insofar as it permits dissolution, in the solvent, of the unsaturated polymer serving as the raw material, it preferably falls within a range of from 2 to 1000 times the weight of the unsaturated polymer, more preferably within a range of from 3 to 100 times the weight of the unsaturated polymer from the standpoints of safety and economy.

Although no particular limitation is imposed on the hydrogen pressure in the hydrogenation reaction insofar as it permits the progress of the reaction, it preferably falls within a range of from 0.1 to 15 MPa, more preferably 10 MPa or smaller.

The hydrogenation reaction is performed at a temperature preferably from 60 to 140° C., more preferably from 80 to 120° C.

A hydrogenation ratio in the hydrogenation reaction is preferably from 90 to 100 mol %, more preferably from 95 to 100 mol % when the weather resistance of the resulting polymer is taken into consideration. The term "hydrogenation ratio" as used herein means a molar fraction of a hydrogenated olefinic carbon-carbon double bond relative to the total amount of the olefinic double bond in the unsaturated polymer. The hydrogenation ratio can be determined by a known method such as $^1$H-NMR.

The hydrogenation reaction can be carried out, for example, by pouring in a pressure-resistant container a solution obtained by dissolving the unsaturated polymer in an organic solvent, adding a hydrogenation catalyst to the resulting solution, substituting the atmosphere in the container with nitrogen, substituting the atmosphere further with hydrogen, adjusting the reaction container to a predetermined pressure by feeding it with a hydrogen gas and setting the container at a predetermined temperature.

After completion of the hydrogenation reaction, the polymer of the present invention can be isolated by an operation ordinarily employed at the time of isolation of a polymer from its solution.

The polymer is isolated by a known method such as re-precipitation, solvent removal under heating, solvent removal under reduced pressure and solvent removal by azeotropy with water vapor (steam stripping).

If desired, the hydroxy group and/or the functional group that can be converted into a hydroxy group of the polymer thus obtained by hydrogenation may be converted into another functional group in a known manner. One example of this conversion is elimination of the protecting group from the protected hydroxy group in a known manner.

The polymer of the present invention may be used either singly or as a composition mixed with another polymer such as polyamide, polyurethane, polyester, polycarbonate, polyoxymethylene resin, acrylic resin, polyvinyl alcohol, ethylene-vinyl alcohol copolymer, polyolefin, polystyrene or styrene block copolymer. When the polymer is used as a composition, it is possible to add, as desired, optional components, for example, various additives such as stabilizer, lubricant, pigment, impact resistance improver, processing aid, nucleating agent, reinforcing agent, colorant, flame retardant, weather resistance improver, ultraviolet absorber, antioxidant, hydrolysis resistance improver, mildew-proofing agent, antibacterial agent, light stabilizer, antistatic, silicone oil, anti-blocking agent, mold release agent, foaming agent and perfume; various fibers such as glass fibers and polyester fibers; fillers such as talc, silica and wood meal; and various coupling agents.

The polymer of the present invention can be used, in the above-described form, for various purposes such as adhesives, pressure sensitive adhesives, compatibilizing agents and sealing materials.

EXAMPLES

The present invention will hereinafter be described in detail by Examples. It should, however, be borne in mind that the invention is not limited by these examples.

In Examples and Comparative Examples, an oxygen permeation amount was measured by the below-described method.

Measurement of Oxygen Permeation Amount

A film formed by press molding was allowed to stand in the air of 90% RH at 20° C. for 5 days. An oxygen permeation amount of the film was measured at 20° C. and 90% RH in accordance with the method as described in JIS K7126 (equal pressure method) using "MOCON OX-TRAN2/20" (product of Modern Control).

The smaller the oxygen permeation amount, the better oxygen barrier properties.

Example 1

(a) Preparation of poly(5-cyclooctene-1,2-diol)

In a three-necked flask having an internal volume of 100 ml and equipped with a thermometer, a dropping funnel, a reflux tube and a stirrer were charged 5.0 g (0.04 mol) of 5-cyclooctene-1,2-diol and 8 ml of methylene chloride in an argon atmosphere. The solution thus prepared was kept at 40° C. Under stirring, a solution obtained by dissolving 1.5 mg (1.8 μmol) of 1,3-bis(2,4,6-trimethylphenyl)-4,5-dihydroimidazol-2-ylidene(tricyclohexylphosphine)benzylideneruthenium dichloride and 68 mg (0.7 mmol) of 3-cis-hexen-1-ol in 1 ml of methylene chloride was added dropwise over 1 minute.

After stirring at 40° C. for 24 hours, a solution obtained by dissolving 0.5 g (6.9 mmol) of ethyl vinyl ether in a solvent mixture of 14 ml of methanol and 7 ml of methylene chloride was added. The resulting mixture was stirred at room temperature. The reaction mixture was poured in 200 ml of hexane and poly(5-cyclooctene-1,2-diol) thus precipitated was separated by filtration and then collected. The yield of the polymer was 98 wt. %. The molecular weight of the poly(5-cyclooctene-1,2-diol) was measured by gel permeation chromatography [GPC (developing solvent:

hexafluoroisopropanol, in terms of standard polymethyl methacrylate)]. As a result, it was found to have a number average molecular weight of 9,500 and a weight average molecular weight of 26,600.

(b) Hydrogenation of poly(5-cyclooctene-1,2-diol)

Under a nitrogen atmosphere, 1 g of the poly(5-cyclooctene-1,2-diol) obtained in the above (a) was dissolved in a solvent mixture of 18 g of tetrahydrofuran and 15 g of methanol. The resulting solution was charged in an autoclave having an internal volume of 300 ml, made of Hastelloy-C, and equipped with a pressure gauge, safety valve, hydrogen gas inlet tube, thermometer, sampling tube and a stirrer. A supported palladium catalyst (40 mg) prepared in accordance with the method as described in Referential Example 1 of U.S. Pat. No. 6,559,241 was added to the solution. After the atmosphere in the autoclave was substituted with a hydrogen gas three times, the temperature in the autoclave was raised from room temperature to 100° C. over 30 minutes by an external heating furnace, while stirring under a hydrogen pressure of 3.9 MPa. The autoclave was maintained at that temperature for 4 hours. During this period, hydrogen was fed to the autoclave in order to maintain the hydrogen pressure at 3.9 MPa. After cooling to room temperature, the reaction mixture was taken out from the autoclave and the palladium catalyst was filtered out. The filtrate was poured in 300 ml of acetone and 0.9 g of the polymer thus precipitated was collected. It was confirmed by 500 MHz $^1$H-NMR spectrum (DMSO-$d_6$ solution, measured at 85° C.) that the hydrogenation ratio of the resulting polymer was 99.3%, the molar ratios of the hydroxy group at the terminal of the molecule, aldehyde group at the terminal of the molecule and acetal group in the molecule were 0.4 mol %, 0.03 mol % and 0.51 mol %, respectively, 0.93 mol % in total, based on the total molar amount of the structural units constituting the polymer.

The resulting polymer was press molded at a press temperature of 190° C. and pressure of 9.8 MPa into a pressed film having a uniform thickness of 100 μm. The oxygen permeation amount of the resulting pressed film at a relative humidity of 90% RH was measured in the above-described method. As a result, it was smaller than 1 cc·20 μm/m$^2$·day·atm.

Example 2

A solution obtained by dissolving 1 g of the poly(5-cyclooctene-1,2-diol) obtained in (a) of Example 1 in a solvent mixture of 18 g of tetrahydrofuran and 15 g of methanol was charged in an autoclave having an internal volume of 300 ml, made of Hastelloy-C, and equipped with a pressure gauge, a safety valve, a hydrogen gas inlet tube, a thermometer, a sampling tube and a stirrer. Chlorotris (triphenylphosphine)rhodium (43 mg) was added to the solution. After the atmosphere in the autoclave was substituted with a hydrogen gas three times, the temperature in the autoclave was raised from room temperature to 60° C. over 30 minutes by an external heating furnace, while stirring under a hydrogen pressure of 9.8 MPa. The reaction mixture was kept at the same temperature for 6 hours. During this period, hydrogen was fed to the autoclave in order to maintain the hydrogen pressure at 9.8 MPa. After cooling to room temperature, the reaction mixture was taken out from the autoclave and poured in 300 ml of acetone, whereby 0.92 g of the polymer thus precipitated was collected. It was confirmed by 500 MHz $^1$H-NMR spectrum (DMSO-$d_6$ solution, measured at 85° C.) that the hydrogenation ratio of the resulting polymer was 99.3%, the molar ratios of the hydroxy group at the terminal of the molecule, aldehyde group at the terminal of the molecule and acetal group in the molecule were 1.33 mol %, 0.02 mol % and 0.45 mol %, respectively, 1.80 mol % in total, based on the total molar amount of the structural units constituting the polymer.

The resulting polymer was press molded at a press temperature of 190° C. and pressure of 9.8 MPa into a pressed film having a uniform thickness of 100 μm. The oxygen permeation amount of the resulting pressed film at a relative humidity of 90% RH was measured in the above-described method. As a result, it was smaller than 1 cc·20·μm/m$^2$·day·atm.

Comparative Example 1

(a) Preparation of poly(5-cyclooctene-1,2-diol)

In a three-necked flask having an internal volume of 100 ml and equipped with a thermometer, a dropping funnel, a reflux tube and a stirrer were charged 5.0 g (0.04 mol) of 5-cyclooctene-1,2-diol and 8 ml of methylene chloride in an argon atmosphere. The solution thus prepared was kept at 40° C. Under stirring, a solution obtained by dissolving 26.4 mg (0.03 mmol) of bis(tricyclohexylphosphine)benzylidene ruthenium dichloride in 1 ml of methylene chloride was added dropwise over 1 minute. After stirring at 40° C. for 24 hours, a solution obtained by dissolving 0.5 g (6.9 mmol) of ethyl vinyl ether in a solvent mixture of 14 ml of methanol and 7 ml of methylene chloride was added. The resulting mixture was stirred at room temperature. The reaction mixture was poured in 200 ml of hexane and poly(5-cyclooctene-1,2-diol) thus precipitated was separated by filtration and then collected. The yield of the polymer was 53 wt. %. The molecular weight of the poly(5-cyclooctene-1, 2-diol) was measured by gel permeation chromatography [GPC (developing solvent: hexafluoroisopropanol, in terms of standard polymethyl methacrylate)]. As a result, it was found to have a number average molecular weight of 9,500 and a weight average molecular weight of 28,500.

(b) Hydrogenation of poly(5-cyclooctene-1,2-diol)

Under a nitrogen atmosphere, a solution obtained by dissolving 1 g of the poly(5-cyclooctene-1,2-Diol) obtained in the above (a) in a solvent mixture of 18 g of tetrahydrofuran and 15 g of methanol was charged in an autoclave having an internal volume of 300 ml, made of Hastelloy-C, and equipped with a pressure gauge, a safety valve, a hydrogen gas inlet tube, a thermometer, a sampling tube and a stirrer. Chlorotris(triphenylphosphine)rhodium (43 mg) was added to the solution. After the atmosphere in the autoclave was substituted with a hydrogen gas three times, the temperature in the autoclave was raised from room temperature to 60° C. over 30 minutes by an external heating furnace, while stirring under a hydrogen pressure of 9.8 MPa. The reaction mixture was kept at the same temperature for 6 hours. During this period, hydrogen was fed to the autoclave in order to maintain the hydrogen pressure at 9.8 MPa. After cooling to room temperature, the reaction mixture was taken out from the autoclave and poured in 300 ml of acetone, whereby 0.9 g of the polymer thus precipitated was collected. It was confirmed by 500 MHz $^1$H-NMR spectrum (DMSO-$d_6$ solution, measured at 85° C.) that the hydrogenation ratio of the resulting polymer was 99.9%, the molar ratios of the hydroxy group at the end of the molecule, aldehyde group at the end of the molecule and acetal group in the molecule were 1.4 mol %, 0.11 mol % and 0.56 mol %, respectively, 2.07 mol % in total, based on the total molar amount of the structural units constituting the polymer.

The resulting polymer was press molded at a press temperature of 190° C. and pressure of 9.8 MPa into a pressed film having a uniform thickness of 150 μm. The oxygen permeation amount of the resulting pressed film at a relative humidity of 90% RH was measured in the above-described method. As a result, it was 7 cc·20 μm/m²·day·atm.

Comparative Example 2

In a similar manner to that employed for (b) of Comparative Example 1 except that 43 mg of bis(tricyclohexylphosphine)benzylideneruthenium dichloride used as the polymerization catalyst in (a) of Comparative Example 1 was used as a hydrogenation catalyst, the poly(5-cyclooctene-1,2-diol) was hydrogenated. After completion of the reaction, the reaction mixture was cooled to room temperature and then taken out from the autoclave. The reaction mixture was poured in 300 ml of acetone and 0.9 g of the polymer thus precipitated was collected. It was confirmed by 500 MHz $^1$H-NMR spectrum (DMSO-$d_6$ solution, measured at 85° C.) that the hydrogenation ratio of the resulting polymer was 99.9%, the molar ratios of the hydroxy group at the end of the molecule, aldehyde group at the end of the molecule and acetal group in the molecule were 1.63 mol %, 0.38 mol % and 0.27 mol %, respectively, 2.28 mol % in total, based on the total molar amount of the structural units constituting the polymer.

The resulting polymer was press molded at a press temperature of 190° C. and pressure of 9.8 MPa into a pressed film having a uniform thickness of 150 μm. The oxygen permeation amount of the resulting pressed film at a relative humidity of 90% RH was measured in the above-described method. As a result, it was 16.2 cc·20 μm/m²·day·atm.

INDUSTRIAL APPLICABILITY

According to the present invention, a novel polymer excellent in performances such as oxygen barrier properties and a process for producing the polymer are provided.

The polymer of the present invention can be used, either singly or as a composition containing another polymer or an optional component such as various additives, filler or coupling agent, for various purposes such as adhesives, pressure sensitive adhesives, compatibilizing agents and sealing materials.

This application has Japanese Patent Application No. 2003-53028 filed in Japan as a base of the claim of priority and its content is incorporated herein in its entirety. Documents including patents and patent applications cited herein will be incorporated herein at the same level as the contents of them are disclosed by citation.

The invention claimed is:

1. A polymer comprising mainly structural units represented by the following general formula (1):

wherein, n stands for an integer of from 2 to 10; $X_1$ and $X_2$ each represents a hydrogen atom, a hydroxy group or a functional group that can be converted into a hydroxy group, provided that at least one of $X_1$ and $X_2$ represents a hydroxy group or a functional group that can be converted into a hydroxy group; $R_1$, $R_2$ and $R_3$ each represents a hydrogen atom, an alkyl group having from 1 to 5 carbon atoms, an aryl group, an aralkyl group or a heteroaryl group, provided that plural $R_1$s may be the same or different, wherein the total molar amount of terminal aldehyde group and acetal group contained in the polymer is 0.6 mol % or smaller relative to the total molar amount of the structural units represented by the formula (1);

wherein the polymer is produced by a process comprising ring-opening, in the presence of a metal alkylidene complex comprising a ligand with an imidazolidine structure, a cyclic olefin comprising at least one cyclic olefin further comprising a hydroxy group or a functional group that can be converted into a hydroxy group, and hydrogenating a resulting unsaturated polymer to produce the polymer.

2. The polymer according to claim 1, wherein $X_1$ and $X_2$ each represents a hydroxy group or a functional group that can be converted into a hydroxy group.

3. The polymer according to claim 1, wherein the functional group that can be converted into a hydroxy group is an epoxy group or a hydroxy group protected with a protecting group.

4. The polymer according to claim 1, wherein the functional group that can be converted into a hydroxy group is a functional group selected from the group consisting of an epoxy group, acyloxy groups, alkoxy groups, alkoxycarbonyloxy groups, aryloxycarbonyloxy groups, alkoxyalkyleneoxy groups and siloxy groups.

5. A process for producing a polymer according to claim 1, comprising ring-opening, in the presence of a metal alkylidene complex comprising a ligand with an imidazolidine structure, a cyclic olefin comprising at least one cyclic olefin further comprising a hydroxy group or a functional group that can be converted into a hydroxy group, and hydrogenating a resulting unsaturated polymer to produce the polymer of claim 1.

6. The polymer according to claim 2, wherein the functional group that can be converted into a hydroxyl group is an epoxy group or a hydroxyl group protected with a protecting group.

7. The polymer according to claim 2, wherein the functional group that can be converted into a hydroxy group is a functional group selected from the group consisting of an epoxy group, acyloxy groups, alkoxy groups, alkoxycarbonyloxy groups, aryloxycarbonyloxy groups, alkoxyalkyleneoxy groups and siloxy groups.

* * * * *